(12) United States Patent
Bergkvist et al.

(10) Patent No.: US 9,143,536 B2
(45) Date of Patent: Sep. 22, 2015

(54) DETERMINING A LOCATION ADDRESS FOR SHARED DATA

(75) Inventors: Adam Bergkvist, Luleå (SE); Daniel Enström, Gammelstad (SE); Johan Kristiansson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 96 days.

(21) Appl. No.: 13/982,093

(22) PCT Filed: Jan. 31, 2011

(86) PCT No.: PCT/EP2011/051328
§ 371 (c)(1),
(2), (4) Date: Jul. 26, 2013

(87) PCT Pub. No.: WO2012/103930
PCT Pub. Date: Aug. 9, 2012

(65) Prior Publication Data
US 2013/0308633 A1    Nov. 21, 2013

(51) Int. Cl.
*H04L 12/28* (2006.01)
*H04L 29/06* (2006.01)
*H04L 29/12* (2006.01)

(52) U.S. Cl.
CPC .......... *H04L 65/1069* (2013.01); *H04L 61/157* (2013.01); *H04L 65/1016* (2013.01); *H04L 65/1073* (2013.01)

(58) Field of Classification Search
USPC ....................................................... 709/219
See application file for complete search history.

(56) References Cited

U.S. PATENT DOCUMENTS

| 5,895,500 | A | 4/1999 | Thomason et al. | |
|---|---|---|---|---|
| 8,412,834 | B2* | 4/2013 | Khasnabish | 709/227 |
| 2003/0023702 | A1* | 1/2003 | Kokku et al. | 709/216 |
| 2004/0156394 | A1* | 8/2004 | Westman | 370/471 |
| 2007/0043829 | A1 | 2/2007 | Dua | |
| 2010/0235481 | A1 | 9/2010 | Deutsch et al. | |
| 2011/0007735 | A1* | 1/2011 | Kruithof | 370/352 |

OTHER PUBLICATIONS

Chang, Fay et al., "Bigtable: A Distributed Storage System for Structured Data", Proceedings of the 7th USENIX Symposium on Operating Systems Design and Implementation, 2006, 1-14.
Lindström, Jan, "Distributed Optimistic Concurrency Control for Real-Time Database Systems", 10th International Conference on Real-Time and Embedded Computing Systems and Applications, Aug. 2009, 1-21.

(Continued)

*Primary Examiner* — Duc C Ho
(74) *Attorney, Agent, or Firm* — Murphy, Bilak & Homiller, PLLC (57) ABSTRACT

A method and apparatus for determining a location address for shared packet switched data. The data is to be accessible by a user of a first device and a user of a second device. A symmetric function is applied to a known identifier associated with the first device and a known identifier associated with the second device. The result of the function can then be used as an address for data to be accessible by users of both the first device and the second device, the data being stored on a remote server at a location defined by the address. The method ensures that the same address is calculated regardless of which identifier is used first, and that both devices can calculate the address without requiring any further signalling or capability/discovery mechanism.

18 Claims, 3 Drawing Sheets

(56) References Cited

OTHER PUBLICATIONS

Nichols, David A. et al., "High-Latency, Low-Bandwidth Windowing in the Jupiter Collaboration System", Proceedings of the 8th annual ACM symposium on User interface and software technology, 1995, 111-120.

Rosenberg, J. et al., "A Usage of Resource Location and Discovery (RELOAD) for Public Switched Telephone Network (PSTN) Verification", IETF, Internet-draft, draft-rosenberg-dispatch-vipr-reload-usage-00, Nov. 9, 2009, 1-9.

Rosenberg, J. et al., "Session Initiation Protocol (SIP) Extensions for Blocking VoIP Spam Using PSTN Validation", IETF, Internet-draft, draft-rosenberg-dispatch-vipr-sip-antispam-00, Nov. 9, 2009, 1-8.

Rosenberg, J. et al., "The Public Switched Telephone Network (PSTN) Validation Protocol (PVP)", IETF, Internet Draft, draft-rosenberg-dispatch-vipr-pvp-00, Nov. 9, 2009, 1-26.

Rosenberg, J.et al., "Verification Involving PSTN Reachability: Requirements and Architecture Overview", IETF, Internet-draft, draft-rosenberg-dispatch-vipr-overview-00, Nov. 8, 2009, 1-37.

Rosenberg, J. et al., "Verification Involving PSTN Reachability: The ViPR Access Protocol (VAP)", IETF, Internet Draft, draft-rosenberg-dispatch-vipr-vap-00, Nov. 9, 2009, 1-45.

Rosenberg, J.R. et al., "Verification Involving PSTN Reachability: Requirements and Architecture Overview", IETF, Internet-draft, draft-rosenberg-dispatch-vipr-overview-04, Oct. 25, 2010, 1-42.

Saito, Yasushi et al., "Optimistic Replication", ACM Computing Surveys, vol. 37, No. 1, Mar. 2005, 42-81.

Sun, Chengzheng et al., "Achieving Convergence, Causality Preservation, and Intention Preservation in Real-Time Cooperative Editing Systems", ACM Transactions on Computer-Human Interaction, vol. 5, No. 1, Mar. 1998, 63-108.

Unknown, Author, "Cassandra", The Apache Cassandra Project, Accessed May 30, 2010, Available online at: http://cassandra.apache.org/, 1-3.

Unknown, Author, "Comet (programming)", Wikipedia, the free encyclopedia Accessed May 30, 2015. Available online at: http://en.wikipedia.org/wiki/Comet_(programming), 1-7.

Unknown, Author, "Operational transformation", Wikipedia, the free encyclopedia. Accessed May 30, 2010. Available online at: http://en.wikipedia.org/wiki/Operational_transformation, 1-10.

Unknown, Author, "The WebSocket API", W3C Editor's Draft, Accessed May 30, 2010, Available online at: http://dev.w3.org/html5/websockets, 1-22.

* cited by examiner

DETERMINING A LOCATION ADDRESS FOR SHARED DATA

TECHNICAL FIELD

The invention relates to the field of determining a location address for shared data.

BACKGROUND

Mobile telephones are used throughout the world, and can offer a user a variety of services. A mobile telephone is identified by an E.164 number, which is a unique identifier that has a predetermined format; typically it starts with a number code to identify the country in which the mobile telephone is registered, and also includes a number code to identify the geographic region within the country in the case of land lines, or the mobile service provider in the case of mobile telephones. The remaining numbers identify the mobile telephone uniquely within that country and service provider or geographical area.

All mobile telephones support circuit switched (CS) voice calls and Short Message Service (SMS) messaging for sending text messages. Sometimes services may go beyond that of traditional telephony, but even so telephony is used as a means to set up a communication session between two mobile telephones even where the communication session is not a voice call or SMS message.

An example of such a scheme is where an initial service discovery in order to determine whether the receiver has the capabilities of receiving such a communication session is initially done using a traditional telephony call. The receiver's E.164 number is used to contact the receiver, and once the capabilities of the receiver have been established, the communication session can begin. The communication session need not use the E.164 number, but could instead use, for example, an Instant Messaging address.

A similar approach is used for so-called combinational services (CSI). CSI has a mode in which a normal CS telephony call using an E.164 number secures a voice communication between two devices such as mobile telephones, and a separate but associated IP Multimedia Services (IMS) session is routed via IP to add functionality such as video.

The above two examples illustrate that a CS telephone call using an E.164 number can be used to initiate a more advanced packet switched (PS) communication service.

Distributed Shared Memory (DSM), also known as Distributed Global Address Space (DGAS) is a concept in which two or more devices, such as mobile telephones or personal computers, have access to a shared memory. A DSM is a distributed global addressable memory space where each memory space in the DSM is assigned a unique address. By knowing this address, it is possible to get a copy or reference to that memory. By giving both devices the location of the memory space, each device can access the shared memory and make changes to it.

One way to implement a DSM is to provide a centralized solution where the DSM resides on an external server. A drawback to this approach is that whenever a device wishes to write to the DSM, it must acquire a "lock" to the server before making any changes in order to prevent the memory to become corrupted. This means that only one device at a time can update the memory and all other devices must wait until the first device has finished its operations, thus making it unsuitable for implementing collaborative services.

Another approach to implementing a DSM is to let allow each client device to acquire a local copy or replica of the DSM, and then synchronize the DSM in the background. Any modification to a particular DSM is synchronized so that every replica converges to the same state after some time. This is known as eventual consistency as the DSM and the replicas stored at each device only become consistent after a period of time.

Some DSM systems use Operational Transformation (OT) to provide eventual consistency. This allows client devices to use a DSM replica instance locally and then synchronize changes to the DSM master instance in the background. Any operation (such as get, add, delete and clear) on a DSM replica instance is applied immediately without being delayed, as would be the case for a centralized solution in which a server request and response would be required. This makes it possible to implement responsive user interfaces without having to wait for the client device to obtain a lock on the central DSM.

OT is used to resolve merge conflicts that might occur if multiple devices or applications update the same memory at the same time. It allows each application to be completely unaware of other applications or devices. Each device acquires a DSM replica instance, which can be used to store and receive information without having to deal with synchronization issues or use some network signalling protocols to set up a session. Applications can also use a DSM without it having to be fully initialized and replicated. Any updates to the DSM are merged during the replication process.

A DSM can be used to store any kind of information. For example, a shared notes application is used to store text entered by the user. A shared map application stores a link to a map as well as coordinates and zoom settings for the current map view.

Below is an example of pseudo code illustrating how a DSM can be used to implement a shared Google Map application. When a user moves the map, the following code is triggered which will store the current position in the DSM.

```
var hash = dsmServer.get("7126362,7612711"); // get a replica
hash.set("pos",{"lat":45.47371747815213,"lng":32.49429836273188});
hash.submit( ); // send operations to other clients
```

Other client devices or applications that are also running the shared Google Map application will have their replicas updated when another client device or application changes a value stored in the DSM.

```
    map = new google.maps.Map(...);
    var hash = dsmServer.get("7126362,7612711"); // get a replica
    hash.onRemoteUpdate(op) {
        if (op.type==Operation.SET && op.key=="pos") {
            var tmp = JSON.parse(op.value);
            var ltlg = new google.maps.LatLng(tmp.lat, tmp.lng);
            map.setCenter(ltlg);
        }
    }
```

Client devices can respond to changes in the DSM, for example a change to the current position of the Google Map, using the pseudo code above.

A shared map is only one example how a DSM can be used to implement a collaborative service. Other examples include shared notes, a remote telepointer, or a shared whiteboard. A DSM can be used to implement the sharing of any functions relating to PS data such as information available on a web page.

As described above, it is known to add PS functionality to a CS call using a separate session, and to use the CS call as a way of initializing the separate session. However, this relies on predefined content of the communication session such as voice, video, images. There is no support for a more dynamic interactivity such as shared whiteboards or shared notes.

Shared whiteboards, and screen sharing in general, can be found in PS applications but so far, no service exists today which combines an evolved CS call (such as CSI and Facetime) with interactive applications as described above.

SUMMARY

It is an object of the present invention to provide a mechanism for addressing a shared memory space that removes the need for capability negotiation and further signalling.

According to a first aspect of the invention, there is provided a method of determining a location address for shared packet switched data. The data is to be accessible by a user of a first device and a user of a second device. A symmetric function is applied to a known identifier associated with the first device and a known identifier associated with the second device. The result of the function can then be used as an address for data to be accessible by users of both the first device and the second device, the data being stored on a remote server at a location defined by the address. The term "symmetric function" is used herein to describe a function that produces the same result whether the function is applied to the identifier associated with the first device with the identifier associated with the second device, or the function is applied to the identifier associated with the second device with the identifier associated with the first device. This ensures that the same address is calculated regardless of which identifier is used first, and that both devices can calculate the address without requiring any further signalling or capability/discovery mechanism.

As an option, the known identifier associated with the first device is an E.164 number associated with the first device, and the known identifier associated with the second device is an E.164 number associated with the second device. These numbers are known to both devices once a call has been established or if both devices already have knowledge of the other device's number.

As a further option, the known identifiers are identifiers for use in a circuit switched network.

As an alternative option, the known identifier for the first device is an identifier associated with a user of the first device, and the known identifier for the second device is an identifier associated with a user of the second device. Examples of such identifiers include an email address and a SIP address.

As an option, the remote server is a Distributed Shared Memory server.

The method optionally comprises the remote server monitoring accessing of the shared data by the user of the first device and the user of the second device. In the event that the user of the second device does not access the shared data, the remote server determines that the user of the second device does not have a capability to access the shared data.

As an option, the method further comprises, prior to performing the symmetric function on the known identifier associated with the first device and the known identifier associated with the second device, authenticating any of the first device, a user of the first device, the second device and the user of the second device. This ensures that the shared data can only be accessed by the users of the devices and not by a malicious third party.

The method optionally comprises establishing a voice communication session between the first device and the second device, and establishing a data communication session allowing access to the shared data by a user of the first device and a user of the second device. By establishing a voice communication session, each device is aware of the identifier (such as an E.164 number) associated with the other user, and can calculate the address. As a further option, at least one of the users accesses the shared data using a device other than the first and second devices. This allows a user to access the shared data even if the device used to establish the voice communication is not capable of accessing the data.

As an option, the method comprises, at the remote server, receiving a message, the message including the address for data to be accessible by users the first and second devices. In the event that data at the address does not exist, the remote server creates a shared memory space for data at the address, accessible by the first and second devices.

According to a second aspect, there is provided a device for use in a communication network. The device is provided with a processor for applying a symmetric function to an identifier associated with the device and an identifier associated with a second device with which it is required to share packet switched data accessible by a user of the device and a user of the second device. A transmitter is provided for sending a message to a remote server, the message including the result of the function. The result of the function is usable by the remote server as a location address for the packet switched data.

As an option, the identifier associated with the first device is selected from any of an E.164 number, an email address, and a SIP address.

The device optionally further comprises any of a communication device to establish a voice communication session between the first device and the second device, and a communication device to establish a data communication session with the remote server.

According to a third aspect, there is provided a server for use in a communication network. The server is provided with a receiver for receiving a message from a first device, the message including an address location. The address location is obtained by applying a symmetric function to an identifier associated with the device and an identifier associated with a second device. A computer readable medium in the form of a memory is provided, which is used for storing data at the address location received in the message. A transmitter and a receiver are provided for sending and receiving communications relating to the data with a user of the first device, and a further transmitter and a further receiver are provided for sending and receiving communications relating to the data with a user of the second device.

The server is optionally provided with a processor for monitoring access to the data by either of the user of the first device or the second device. This can indicate whether the first or second devices have the capability to access the data, or whether the users of the first or second device wish to access the data.

According to a fourth aspect, there is provided a computer program product, comprising computer readable code which, when run on a device, causes the device to perform a method as described above in the first aspect.

According to a fifth aspect, there is provided a computer program product, comprising computer readable code which, when run on a server, causes the server to behave as a server according to the third aspect described above.

According to a sixth aspect, there is provided a computer program product comprising a computer readable medium

DETAILED DESCRIPTION

Figure 1:
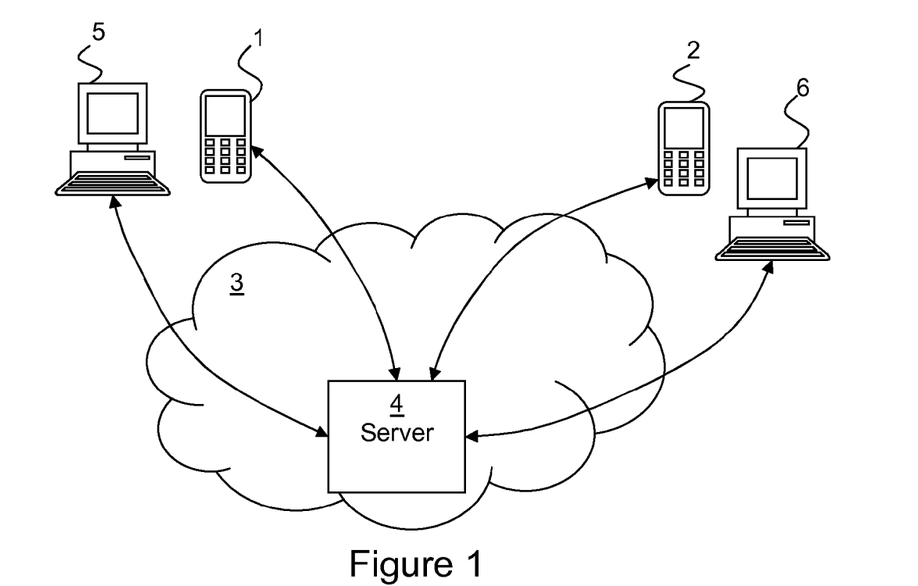
FIG. 1 illustrates schematically in a block diagram a network architecture according to an embodiment of the invention.

FIG. 1 shows a first client device 1 and a second client device 2, which can both communicate via a network 3 with a remote server 4. The client devices both have E.164 numbers that are used to identify them.

The server 4 in this example is a DSM server that provides a DSM master instance that can be accessed by the users of each client device 1, 2. The user of the first device 1 wishes to establish a voice call with the user of the second device 2, and also wishes to establish a DSM that both users can access. In order to reduce signalling, it is desirable that the DSM can be acquired directly without discovery signalling or setting up a new session with a remote peer.

According to the invention, the only information required to establish a DSM is an identifier for each user. In an exemplary embodiment, this identifier is the E.164 number for each device 1, 2, although it will be appreciated that a different type of identifier such as an email address or a SIP address may be used. For the first device 1 to call the second device 2, it only needs to know the E.164 number of the second device 2. As it already has this information, no further information is required in order to establish a DSM.

A unique identifier is constructed using the E.164 numbers (or other identifiers) for addressing the DSM space to be used by the users of both devices 1, 2. In order to prevent unnecessary signalling, the DSM address that is established using the E.164 numbers must fulfil the following requirements:

1. The DSM address must be unique to ensure that no other users can access the same DSM address, or inadvertently create the same DSM address for a different session.

2. The DSM address must be established such that the caller and the callee are treated in the same way. In other words, the same DSM address must be generated regardless of whether the first device 1 calls the second device 2, or the second device 2 calls the first device 1.

3. The calculation of the DSM address must assume that no additional signalling mechanism for establishing a session exists outside the CS call. It must be possible for both the first device 1 and the second device 2 to calculate the DSM address without having knowledge of anything other than the pair of identifiers (E.164 numbers in this case) involved in the communication session.

There are several different ways of calculating a DSM address that fulfils these requirements. The following provides two exemplary ways:

In most cases, a shared DSM space will be initialized after a telephone call has been set up. In this example, the identifiers used to calculate the DSM address are E.164 numbers, although it will be appreciated that other identifiers can be used so long as the calculation of the DSM address fulfils the three requirements above.

The DSM address used to locate the shared data accessible by both users can be calculated as (A op B), where op represents a mathematical function so that (A op B) is equal to (B op A), A is the E.164 number of the first device 1, and B is the E.164 number of the second device 2. While any symmetrical function will give this result, a simple example of a mathematical operation having such a commutative property is multiplication. This makes it possible for the first device 1 and the second device 2 to calculate the DSM address independently without any further signalling being required. Furthermore, each device will calculate the same DSM address regardless of which client device established the call.

An alternative method for to calculating the DSM addresses is to use a tuple where the E.164 numbers are sorted, for example, such that the phone number with the largest numerical value is the first value in the tuple, i.e. (x,y) where x=A; y=B if A>B else x=B; y=A. It will be appreciated that many different combinations are possible.

Note that even though an identifier for each device 1, 2 is used to calculate the DSM address, the DSM need not necessarily be accessed by either device 1, 2. For example, each user may have a mobile telephone with limited functionality that can only handle voice calls and SMS messages, and is not capable of accessing the DSM. In this case, the DSM address is established using the identifiers and a voice call is established between the devices 1, 2, and the users access the DSM using a further device such as a personal computer 5, 6. In many cases, at least one of the devices 1, 2 will be capable of handling both the voice call and accessing the DSM space, in which case a further device will not be necessary. In this case, a dialler application can be bundled together with an application for accessing the DSM, as described in more detail later in this document.

As described above, a key advantage of the method for calculating the DSM address is that only known identifiers such as E.164 numbers are calculate the DSM address. In order for this to work, it must be possible to set up a new DSM master instance without any signalling between the devices 1, 2 other than signalling used to establish a call. This leads to some ambiguity as to which device is responsible for instructing the creation of a new DSM master instance on the server 4.

A simple solution would be to assume that the device initiating the voice call is responsible for instructing the server 4 to create a DSM master instance. However, in this case the calling device must be able to notify the called device that a DSM master instance has been created, which further implies that signalling must be sent in addition to the signalling required to set up the call. While this is possible, it is not ideal as it is preferred that no additional signalling is required.

Figure 2:
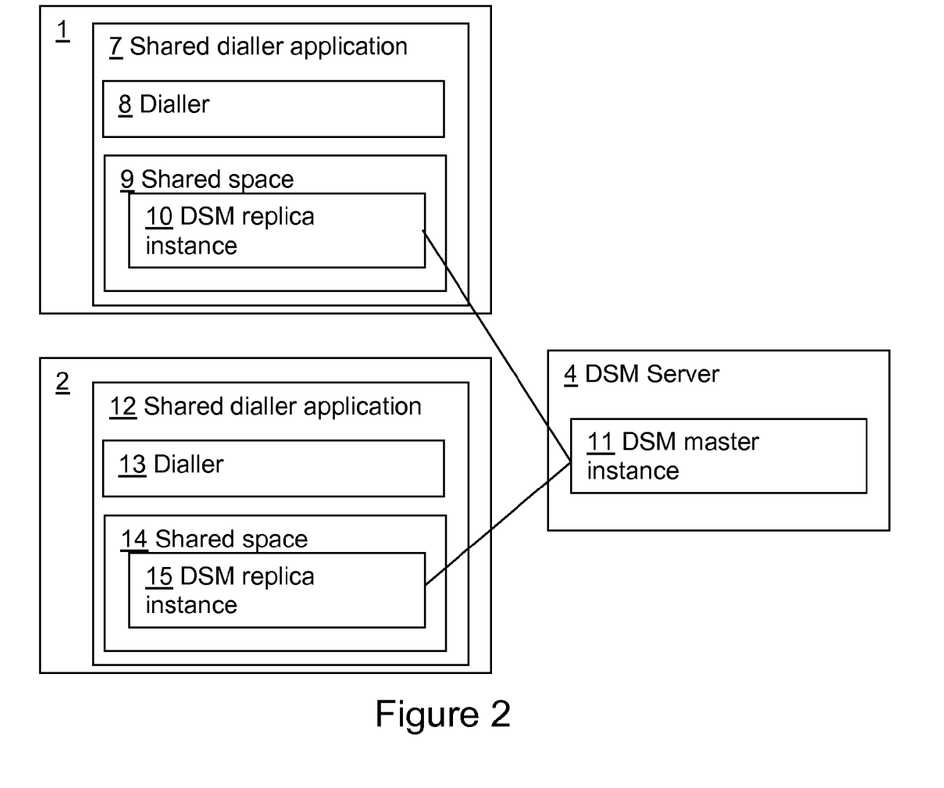
FIG. 2 illustrates schematically in a block diagram a relationship between a DSM master instance and DSM replica instances.

In order to illustrate this, it is helpful to describe the relationship between the DSM master instance and the DSM replica instances, with reference to FIG. 2. In FIG. 2, the first device 1 is running a shared dialler application 7. The shared dialler application includes a dialler 8 for establishing a voice call using E.164 numbers, and access to a shared space 9 at a local memory. The shared space 9 is used to store a DSM replica instance 10 that is derived from a DSM master instance 11 stored at the DSM server 4. Similarly, the second client device 2 has a shared dialler application 12 that includes a dialler 13 for establishing a voice call using E.164 numbers, and access to a shared space 14 at a local memory. The shared space 14 is used to store a DSM replica instance 15 for the second device 2 that is also derived from the DSM master instance 11 stored at the DSM server 4.

A solution to the problem of which device instructs the creation of the DSM master instance 11 is allow both devices 1, 2 to create the DSM master instance 11 at the server 4, and coordination the DSM master instance 11 with the DSM replica instances 10, 15 at the server 4. Any device 1, 2 can check out any DSM replica instance specified by any address. Messages to that DSM are queued until the corresponding DSM master instance 11 is available. In this case, there is actually no dedicated creation process, but rather both devices 1, 2 attempt to request the same DSM replica instance at the same time, where the server 4 queues the messages internally until the DSM master instance 11 is fully operational.

After the first device 1 (assuming the first device is the one establishing the call) has dialed an E.164 number to the second device 2, the Shared Dialler Application 7 calculates the DSM address using one of the methods described above and sends a request to the DSM server 4, requesting a DSM replica instance of that memory. Similarly, when the second device 2 has answered the phone call, the Shared Dialler Application 12 calculates the DSM address using the phone number and sends a similar request to the DSM server 4.

The DSM server 4 processes all incoming messages sequentially. When it receives a message it stores the message in a queue corresponding to the DSM address. The queue is created if it does not exist. The DSM server 4 then creates a new master DSM master instance 11 corresponding to the DSM address. The DSM server 4 then processes all messages found in its designated queue. As far as the devices 1, 2 are aware, the DSM master instance 11 is always running and available.

By storing messages in a queue, each Shared Dialler Application client 7, 12 can starting using a DSM replica instance immediately even if it has not yet been fully configured on the DSM server 4. This makes the shared space highly responsive as the devices 1, 2 do have to wait for server 4 responses, even when creating a new DSM master instance 11.

It is important to be able to restrict access to a DSM. In this case, a DSM address is established using known identifiers such as a pair of E.164 numbers, and since E.164 numbers are publicly available; anyone can address any Session DSM. This leads to security issues that should be addressed. To ensure privacy, it is important that only the users involved in a particular conversation are allowed to access the associated DSM, and as a result each user needs to identify itself and be authenticated to access the DSM address.

In order for a user to get access to the DSM, the user needs to have registered with a service providing the shared dialler application 7, or other means for accessing the DSM. This may be, for example, using a network operator-provided additional service to the phone subscription in which the network operator is provided with a password. It is preferable for the user to be able to access the DSM from any device that can support it, and not just the first device 1.

There are many ways that a user can be authenticated, and a full description of all of the possibilities is out of the scope of this invention. However, an exemplary way to authenticate a user is to use a combination of the identifier (E.164 number in this example) and a password. The security system will then verify that a user is a part of an ongoing conversation before granting access to the DSM. For the user of the first device 1, authentication may be performed automatically by the shared dialler application 7 by storing the password at the first device 1. The shared dialler application 7 authenticates the user automatically when calls are made, on incoming calls, or when the user wishes to perform another action such as browsing a conversation history. A user can also browse its conversation history from any device by using a regular web browser. In this case, the user needs to authenticate with the system manually by providing the phone number and password, as the web browser will not necessarily have the password and be able to authenticate the user.

The above description shows that a DSM address is calculated with no capability negotiation between the devices 1, 2. In some cases, the second device 2 may not be capable of accessing the DSM, or the user of the second device may not choose to access the DSM. However, this leads to an implicit capability discovery mechanism. A DSM is either created automatically the first time that the first device 1 calls the second device 2, or when an old DSM is no longer valid and a new interaction is to be established). If the second device 2 has not connected with the DSM before the call between the first device 1 and second device 2 ends, and the memory is unmodified by the first device 1, the DSM will be automatically removed. If, on the other hand, the second device accesses the DSM during the call, but does not modify the memory, this is detected and it can be concluded that the second device 2 either does not want to participate using the DSM or doesn't have the capability to do so. Another other case occurs when the first device 1 wishes to prepare an interaction DSM before calling the second device 2. The user of the first device 1 can then manually request the creation of the DSM using a web interface, for example one provided by the shared dialler application 7, another web browser at the first device 1, or a web browser at a further device 5.

The implicit negotiation mechanism described above requires a "gatekeeper" to track the presence of the first device 1 and the second device 2 in the DSM. Note that as it is possible for the first device 1 or the second device 2 to read or modify the DSM without a concurrent ongoing CS call, it is not sufficient to simply monitor the DSM to see if there is a similar presence in the DSM from both parties. There are different alternatives how a gatekeeper can solve this. One way is to monitor simultaneous presence of both devices in the DSM. If this happens, the DSM is valid and accessible for both the first device 1 and the second device 2. Another way is to monitor presence in the DSM over a period of time. If both the first device 1 and the second device 2 have been using the DSM, although not necessarily at the same, the DSM is valid and accessible for both the first device 1 and the second device 2.

Figure 3:
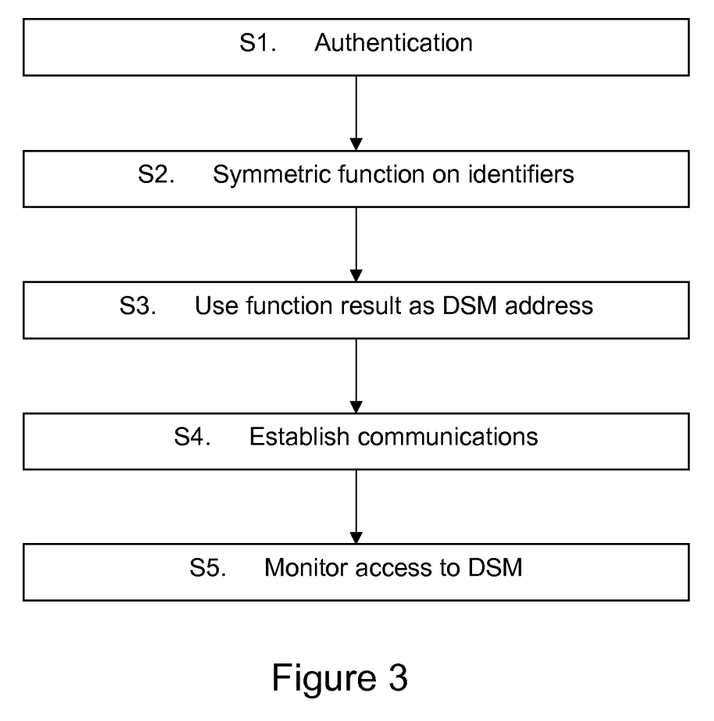
FIG. 3 is a flow diagram showing steps according to an embodiment of the invention.

Turning now to FIG. 3, there is a flow diagram illustrating steps of embodiments of the invention. The following numbering corresponds to that of FIG. 3:

S1. In most circumstances, an authentication step is necessary to ensure that the users of the first device 1 and the second device 2 are entitled to access a DSM space.

S2. Each device calculates the DSM address by performing a symmetric function on the identifiers (such as the E.164 numbers of each device, a email addresses associated with the users, or SIP addresses associated with the users) such that both devices calculate the same DSM address independently.

S3. The calculated address is used to establish or access a DSM master instance 11.

S4. In addition to establishing the DSM master instance, a voice communication or other type of communication may be set up between the devices 1, 2.

S5. A gatekeeper function may monitor access by both devices to the DSM as described above.

Figure 4:
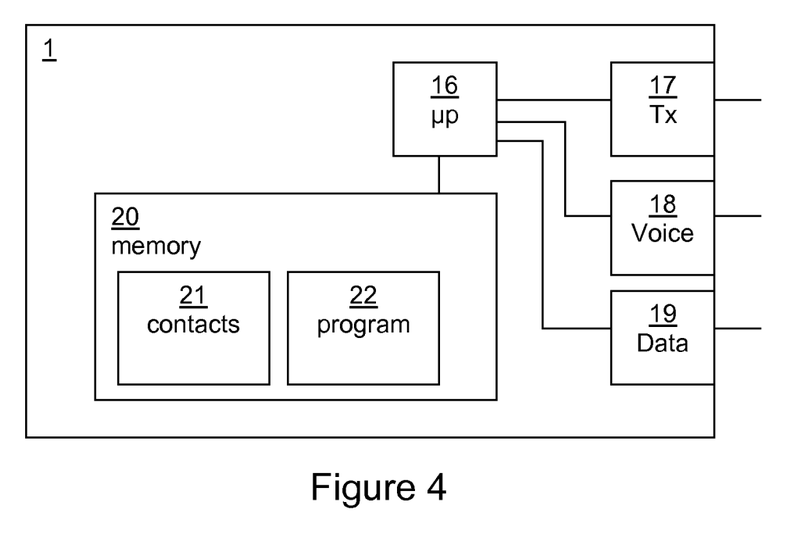
FIG. 4 illustrates schematically in a block diagram a client device according to an embodiment of the invention.

FIG. 4 illustrates schematically in a block diagram a device 1 as described above. The device is provided with a processor 16, a transmitter 17, a communication device 18 for establishing a voice call and a communication device 19 for establishing a data communication with the DMS server 4. A computer readable medium in the form of a memory 20 is also provided, which can be used to store a list of contacts 21 and a program 22 which, when run on the processor 16, causes the device to behave as described above. The processor 16 can obtain an identifier such as an E.164 number, an email address or a SIP address, and use the identifier associated with the second device 2 along with the identifier associated with the device to calculate an address for the DSM by performing a symmetric function as described above. The transmitter 17 is used to send the address to the DMS server 4. The communication devices 18, 19 are typically transceivers or transmitters and receivers and are used to establish the voice call with the second device 2 and the DMS session with the DMS server 4 respectively.

A computer program 22 may also be stored in the memory 20. When the program 22 is run by the processor 16, it causes the device 1 to behave as described above.

Figure 5:
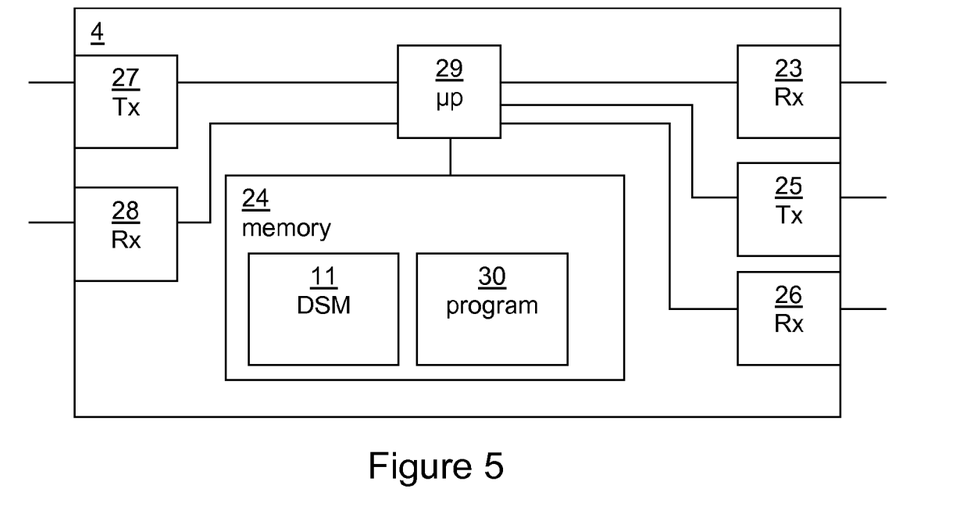
FIG. 5 illustrates schematically in a block diagram a server according to an embodiment of the invention.

FIG. 5 illustrates schematically in a block diagram a DMS server 4. The DMS server 4 is provided with a receiver 23 for receiving a message from the first device 1 that includes the calculated DMS address. A computer readable medium in the form of a memory 24 is provided, which is used for storing DMS data 11 at the address location. A transmitter 25 and a receiver 26 are provided for sending and receiving communications relating to the DMS data with a user of the first device 1, and a further transmitter 27 and receiver 28 are provided for sending and receiving communications relating to the DMS data with a user of the second device 2. A processor 29 is also provided for controlling the server 4 and in one embodiment may be used for monitoring access to the data by either of the user of the first device 1 or the second device 2.

A computer program 30 may also be stored in the memory 24. When the program 30 is run by the processor 29, it causes the server 4 to behave as described above.

There are many ways in which access to the DSM can be implemented. As described above, a user may use a single device with which to establish a voice call and access the DSM, or may use a first device 1 to establish a voice call and a further device 5 to access the DSM.

Figure 6:
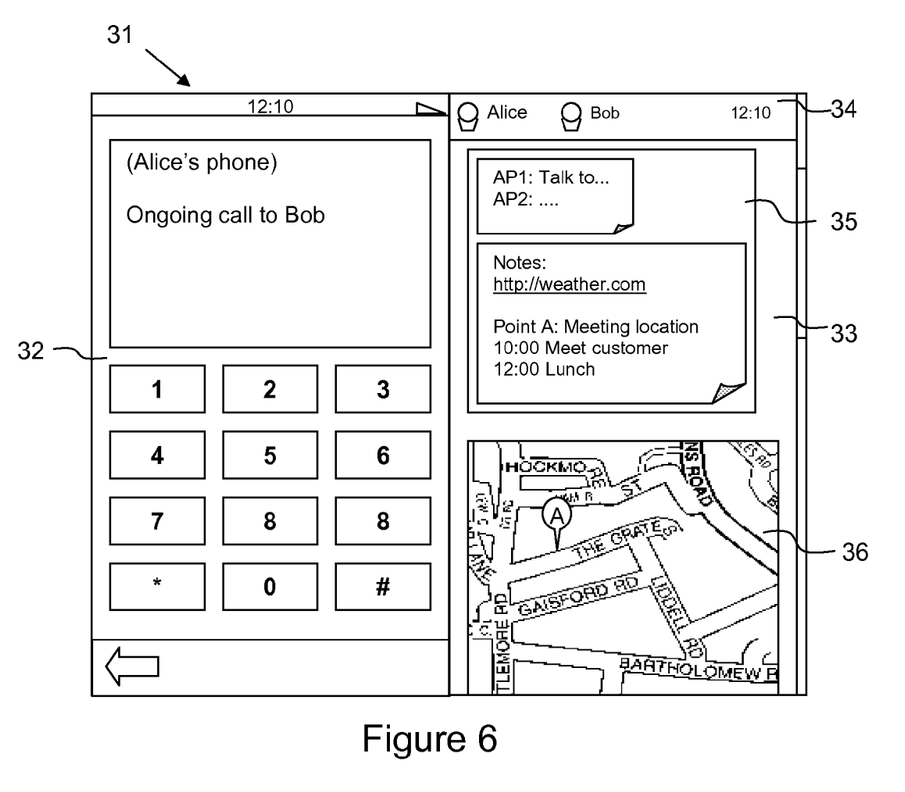
FIG. 6 illustrates a user interface according to an embodiment of the invention.

To further illustrate the invention, FIG. 6 shows a user interface for a Shared Dialler Application that is used on a single device for both establishing the call and accessing the DSM. As can be seen, the user interface 31 for the dialler application 7 consists of two screens. The left screen 32 is a regular dialler application used to establish a call and the right screen 33 holds a panel where web applications can be shared with other devices.

In this example the shared space contains a top panel 34 for general information, such as a clock, and presence indicators showing that both Alice and Bob are currently connected to the shared space. This area may also be used to indicate that the voice call is being recorded. A web application 35 is also provided which can be used to store notes, and a shared maps web application 36 is also shown where, for example, the current view, zoom level and points of interest are shared between the users. This is by way of example only, and it will be appreciated that the shared space may include any shared data, such as documents, presentations, video and so on.

The invention provides an addressing scheme for addressing a DMS space that can be accessed by multiple users using only an identifier such as an E.164 number which can be used to establish a communication session. In one embodiment, it provides an addressing and discovery mechanism for an IP based add-on to a CS telephone call without the need for any additional capability or discovery signalling between two devices, and allows the deployment of a shared dialler application on existing systems without requiring any changes to the CS signalling protocols. The invention makes it possible to implement collaborative services bundles together with regular CS calls and introduce the Shared Dialler Application described above. Previous solutions to similar problems make use of a capability negotiation followed by a separate exchange of addressing information using a rendezvous protocol (such as Session Initiation Protocol, SIP, or Session Description Protocol, SDP), whereas the present invention requires no signalling in the event that a both parties know an identifier for each other, or in the case that E.164 numbers are used. The invention only requires a call to be established in order for both parties to have sufficient information to access the DMS.

Note that the addressing scheme described above can be used for other services for which it can be assumed that all end users possess an identity such as an E.164 number and an accompanying subscription.

It will be appreciated by the person of skill in the art that various modifications may be made to the above-described embodiments without departing from the scope of the present invention.

For example, it is possible that a similar method could be applied to allow more than two users to establish a voice call and a DMS session. In this case, communication between each accessing device would be via a bridge node. The bridge node establishes a one-to-one call with each participating device rather than a one-to-many call. A DSM replica instance can be provided to device and the bridge and the DSM master instance maintained at the DMS server 4.

The following acronyms have been used in the above description:
 CS Circuit Switched
 CSI Combinational Services
 DGAS Distributed Global Address Space
 DSM Distributed Shared Memory
 IMS IP Multimedia Services
 OT Operational Transformation
 PS Packet Switched
 SDP Session Description Protocol
 SIP Session Initiation Protocol
 SMS Short Message Service

The invention claimed is:

1. A method of determining a location address for shared packet-switched data, the data to be accessible by a user of a first device and a user of a second device, the method comprising:
 applying a symmetric function to a known identifier associated with the first device and a known identifier associated with the second device; and
 using the result of the function as an address for data to be accessible by users of both the first device and the second device, the data being stored on a remote server at a location defined by the address.

2. The method of claim 1, wherein the known identifier associated with the first device is an E.164 number associated with the first device and the known identifier associated with the second device is an E.164 number associated with the second device.

3. The method of claim 1, wherein the known identifiers are identifiers for use in a circuit-switched network.

4. The method of claim 1, wherein the known identifier for the first device is an identifier associated with a user of the first device, and the known identifier for the second device is an identifier associated with a user of the second device.

5. The method of claim 4, where each of the identifiers associated with a user comprises any of an email address and a SIP address.

6. The method of claim 1, wherein the remote server is a Distributed Shared Memory server.

7. The method of claim 1, further comprising, at the remote server:
monitoring accessing of the shared data by the user of the first device and the user of the second device; and,
in the event that the user of the second device does not access the shared data, determining that the user of the second device does not have a capability to access the shared data.

8. The method of claim 1, further comprising, prior to applying a symmetric function to a known identifier associated with the first device and a known identifier associated with the second device, authenticating any of the first device, a user of the first device, the second device and the user of the second device.

9. The method of claim 1, further comprising establishing a voice communication session between the first device and the second device, and establishing a data communication session allowing access to the shared data by a user of the first device and a user of the second device.

10. The method according to 9, comprising at least one of the users accessing the shared data using a device other than the first and second devices.

11. The method of claim 1, further comprising, at the remote server:
receiving a message, the message including the address for data to be accessible by users the first and second devices; and,
in the event that data at the address does not exist, creating a shared memory space for data at the address, accessible by the first and second devices.

12. The device of claim 11, further comprising any of a communication device adapted to establish a voice communication session between the first device and the second device, and a communication device adapted to establish a data communication session with the remote server.

13. A device for use in a communication network, the device comprising:
a processor adapted to apply a symmetric function to an identifier associated with the device and an identifier associated with a second device with which it is required to share packet switched data accessible by a user of the device and a user of the second device;
a transmitter adapted to send a message to a remote server, the message including the result of the function, the result of the function being usable by the remote server as a location address for the packet switched data.

14. The device of claim 13, wherein the identifier associated with the first device is selected from any of an E.164 number, an email address, and a SIP address.

15. A server for use in a communication network, the server comprising:
a receiver adapted to receive from a first device a message, the message including an address location, the address location having been obtained by applying a symmetric function to an identifier associated with the device and an identifier associated with a second device;
a computer-readable medium in the form of a memory, the memory being adapted to store data at the address location received in the message;
a transmitter and a receiver adapted to send and receive communications relating to the data with a user of the first device; and
a further transmitter and a further receiver adapted to send and receive communications relating to the data with a user of the second device.

16. The server of claim 15, further comprising:
a processor adapted to monitor access to the data by either of the user of the first device or the second device.

17. A non-transitory computer-readable medium comprising a computer program stored thereupon, the computer program comprising computer readable code which, when run on a device, causes the device to:
apply a symmetric function to a known identifier associated with the first device and a known identifier associated with the second device; and
use the result of the function as an address for data to be accessible by users of both the first device and the second device, the data being stored on a remote server at a location defined by the address.

18. A non-transitory computer-readable medium comprising a computer program stored thereupon, the computer program comprising computer readable code which, when run on a server, causes the server to:
receive from a first device a message, the message including an address location, the address location having been obtained by applying a symmetric function to an identifier associated with the device and an identifier associated with a second device;
store data at the address location received in the message;
send and receive communications relating to the data with a user of the first device; and
send and receive communications relating to the data with a user of the second device.

* * * * *